(12) United States Patent
Harris et al.

(10) Patent No.: US 8,549,325 B2
(45) Date of Patent: Oct. 1, 2013

(54) REDUCING INFORMATION LEAKAGE BETWEEN PROCESSES SHARING A CACHE

(75) Inventors: Peter William Harris, Cambridge (GB); David Paul Martin, Cambridge (GB)

(73) Assignee: ARM Limited, Cambridge (GB)

( * ) Notice: Subject to any disclaimer, the term of this patent is extended or adjusted under 35 U.S.C. 154(b) by 1490 days.

(21) Appl. No.: 12/149,525

(22) Filed: May 2, 2008

(65) Prior Publication Data

US 2008/0288789 A1    Nov. 20, 2008

(30) Foreign Application Priority Data

May 2, 2007   (GB) .................................. 0708506.1

(51) Int. Cl.
*G06F 11/30*   (2006.01)
(52) U.S. Cl.
USPC ........................................ 713/193; 711/206
(58) Field of Classification Search
USPC ................. 711/130, 138, 141, 145, 156, 118, 711/137, 163, 206; 713/189–193
See application file for complete search history.

(56) References Cited

U.S. PATENT DOCUMENTS

| | | | |
|---|---|---|---|
| 6,397,301 B1 | 5/2002 | Quach et al. | |
| 2004/0143720 A1* | 7/2004 | Mansell et al. | 711/206 |
| 2005/0084098 A1 | 4/2005 | Brickell | |
| 2006/0090084 A1* | 4/2006 | Buer | 713/189 |
| 2007/0294496 A1* | 12/2007 | Goss et al. | 711/163 |

FOREIGN PATENT DOCUMENTS

| | | |
|---|---|---|
| EP | 1 404 052 | 3/2004 |
| JP | 2006-506754 | 2/2006 |
| JP | 2006-216012 | 8/2006 |

OTHER PUBLICATIONS

Great Britain Search Report for GB 0708506.1 dated Aug. 24, 2007.
Osvik et al., "Cache Attacks and Countermeasures: the Cases of AES", Nov. 20, 2005.
Bonneau et al., "Cache-Collision Timing Attacks Against AES", 2006.
Japanese Official Action and English translation, Mar. 27, 2012, in corresponding Japanese Application No. 2008-119461.

* cited by examiner

*Primary Examiner* — Farid Homayounmehr
*Assistant Examiner* — Suman Debnath
(74) *Attorney, Agent, or Firm* — Nixon & Vanderhye P.C.

(57) ABSTRACT

A method of impeding leakage of cache access behavioral information of a section of a sensitive process to an untrusted process, said sensitive and untrusted processes being performed by a processor within a data processing apparatus, said data processing apparatus further comprising at least one cache operable to store information required by said processor while performing said sensitive and untrusted processes, the method comprising the steps of prior to commencing processing of a section of said sensitive process by said processor, evicting information stored in locations of said at least one cache which may otherwise be evicted by said sensitive process loading information that may be required by said section of said sensitive process in said at least one cache; commencing processing of said section of said sensitive process by said processor; switching said processor during processing of said section of said sensitive process to said untrusted process in response to a switching request; on switching back to said section of said sensitive process from said untrusted process, evicting information stored in locations of said at least one cache which may otherwise be evicted by said sensitive process loading information that may be required by said section of said sensitive process in said at least one cache prior to recommencing processing of said section of said sensitive process.

18 Claims, 6 Drawing Sheets

```
class MyCrypto
{
   procedure decrypto
   {
      EnterSCS(handler1)

// security-critical processing dependent on the security preconditions
      established by handler1
         // This might consist of cryptographic operations which access a lookup table,
      and hence access the D-cache, based on some secret or otherwise sensitive data, for
      example.

LeaveSCS(handler1)

// ...
      // non-security-critical processing
      // ...

EnterSCS(handler2)

// security-critical processing dependent on the security preconditions
      established by handler2
         // The flow of instruction execution, and hence the I-cache access pattern,
      within this security critical section might be dependent on some secret or otherwise
      sensitive data, for example.

LeaveSCS(handler2)
   } procedure handler1
   {
      // Invalidate part of D-cache, or preload a lookup table into the D-cache, for
      example.
   } procedure handler2
   {
      // Invalidate part of I-cache, or preload a sequence of instructions from the
      docrypto into the I-cache, for example.
   }
}
```

Fig. 6

REDUCING INFORMATION LEAKAGE BETWEEN PROCESSES SHARING A CACHE

TECHNICAL FIELD

This technical field is data processing systems, and the technology relates to reducing information leakage between processes sharing a cache.

BACKGROUND

There arise many instances where the data values associated with one application running on a data processing apparatus are sensitive data values that should not be accessible to other applications. It is clearly important in such situations to ensure that such sensitive data is kept secure so that it cannot be accessed by other applications that may be loaded onto the data processing apparatus, for example hacking applications that have been loaded on to the data processing apparatus with the purpose of seeking access to the sensitive data. This can be a particular concern where the applications share a cache.

It is known to provide a system in which the data processing apparatus is provided with separate domains, these domains providing a mechanism for handling security at the hardware level. Such a system is described for example in commonly assigned co-pending U.S. patent application Ser. No. 10/714,561, now U.S. Pat. No. 7,305,534 this application describing a system having a secure domain and a non-secure domain. In that system, the non-secure and secure domains in effect establish separate worlds, the secure domain providing a trusted execution space separated by hardware enforced boundaries from other execution spaces, and likewise the non-secure domain providing an untrusted execution space.

Software cryptographic systems on multi-processing systems that use shared caches are generally viewed as not secure as there is a potential for information leakage to occur between the processes due to them both sharing a cache. A cache is to some degree transparent to a programmer in that it decides itself where to store data. Known secure systems such as the one described above can prevent a non-secure process storing data in a cache from accessing data stored in the cache by a secure process. However, information regarding the data access pattern of one process can be derived by the other process and this information may be sufficient to allow the security of say a cryptography system to be compromised.

FIG. 1 schematically shows a cryptographic process running in a secure part of a system, and an untrusted process running on a non-secure part of the system. Switching occurs between the processes as each competes for processing time. The untrusted process cannot access data stored in the cache 60 by the cryptographic process. However, it can derive an access pattern of the cryptographic process, by saturating the cache 60, and then following execution of a portion of the cryptographic process, accessing the cache 60 to read the data it saturated the cache 60 with. Access times for this data will tell the untrusted, or in this case hacking, process whether or not the cryptographic process has overwritten that piece of data or not, thus the set of cache lines accessed by the crytopgraphic process can be identified by the hacking process. In the case that the cryptographic process is one using data lookup tables this may be sufficient to enable the encryption to be broken. This is described in detail in "Cache-Collision Timing Attacks Against AES" by Bonneau and Mironov, http://www.stanford.edu/~jbonneau/AES_timing.ppt, and "Cache Attacks and Countermeasures: the case of AES" by Osvik, Shamir and Tromer, http://www.wisdom.weizmann.ac.il/~tromer/.

There are a number of potential solutions to this problem, some of which are described in these documents. For example, in a system having a secure domain for running secure trusted processes and a non-secure domain for running untrusted processes the cache could be flushed on switching between these domains. This is clearly expensive on performance and power.

Alternatively, caches could be divided in that a part of the cache could be statically allocated to a particular domain this would have performance implications. Alternatively, caches could not be used at all, if caches were not to be used, a tightly coupled memory could be used for the lookup tables instead. A drawback of this is that these memories are typically not large. If the tables were permanently stored in the tightly coupled memory then this would use a lot of this restricted memory space, however, if they were copied in when required this would be expensive on performance and power.

Another alterative would be to calculate the lookup tables on the fly, however, this would be slow and would incur a significant power cost.

It would be desirable to impede leakage of information regarding cache access behaviour of a section of a sensitive process to an untrusted process without incurring too large a power or performance overhead.

SUMMARY

A first aspect provides a method of impeding leakage of information regarding cache access behaviour of a section of a sensitive process to an untrusted process, said sensitive and untrusted processes being performed by a processor within a data processing apparatus, said data processing apparatus further comprising at least one cache operable to store information required by said processor while performing said sensitive and untrusted processes, the method comprising the step of: prior to commencing processing of a section of said sensitive process by said processor, evicting information stored in locations of said at least one cache which may otherwise be evicted by said sensitive process loading information that may be required by said section of said sensitive process in said at least one cache.

There are many advantages in allowing different processes running on a processor to share a cache. If some of the processes are sensitive processes while others are untrusted processes then mechanisms have been devised to prevent the untrusted processes from accessing the data that the sensitive processes are manipulating. However, although it is known to protect the data in this way, the fact that they are sharing a cache means that other information such as the cache access behaviour of the sensitive process can be derived by the untrusted process if care is not taken. The method impedes this leakage of information by initially when commencing processing of a section of the sensitive process, evicting any information stored in locations of the cache which may otherwise be evicted by the sensitive process when it loads information that the section of the sensitive process may require. By evicting this information at the start of the processing by the sensitive section, access behaviour of the section of the sensitive process cannot be derived by the untrusted process as all cache locations which that section of the sensitive process may load data to have been evicted. Thus, the untrusted process will need to fill each of these locations following that section of the sensitive process being processed whether or not these locations were actually accessed by the sensitive process and as such no specific information for each cache location can be derived. If the cache line eviction procedure is interrupted, this is not a security risk either as although the attacker can obtain information about how much of the eviction was complete at the time the interrupt occurred he cannot use this to deduce any sensitive data.

A process is a sequence of instructions using its own memory addressing. A process may have several threads of operation.

In some embodiments said method comprises the further steps of: commencing processing of said section of said sensitive process by said processor; switching said processor during processing of said section of said sensitive process to said untrusted process in response to a switching request; on switching back to said section of said sensitive process from said untrusted process, evicting information stored in locations of said at least one cache which may otherwise be evicted by said sensitive process loading information that may be required by said section of said sensitive process in said at least one cache prior to recommencing processing of said section of said sensitive process.

Furthermore, by performing the eviction at the start of the processing of the section, any interrupts requiring switching from this section back to the untrusted processing will not need these further steps to be performed immediately. The further steps must necessarily be performed if a switch back from untrusted processing occurs, however, the fact that these steps can be deferred until the switch back to sensitive secure processing enables the secure to untrusted switch latency to be reduced.

In some embodiments, said step of evicting information stored in locations of said at least one cache which may otherwise be evicted by said sensitive process comprises storing said information that may be required by said section of said sensitive process in said at least one cache.

Although the important thing is to evict the untrusted information stored in these locations a preferred way of doing it is to evict and replace this information with the information that may be required by the section of the sensitive processor. This clearly has performance benefits in that the information that may be required is pre-loaded into the cache and is thus available in the cache if that section of the process does indeed require it. Thus, the steps of evicting the relevant locations can be performed with very little additional cost if this information is later needed by the section.

In some embodiments said processor is operable in a secure domain and a non-secure domain, said processor being operable such that when executing a program in a secure domain said program has access to secure data which is not accessible when said processor is operating in a non-secure domain, wherein said sensitive process is a secure process executed in said secure domain, and said untrusted process is a process executed in a non-secure domain.

Although the sensitive process and the untrusted process may be a number of different processes, for example they may be ordinary processes running in particular environments, in some embodiments they may be further separated such that the sensitive process is a secure process which is executed in a secure domain and the untrusted process is a non-secure process.

In some embodiments said processor is operable to process a plurality of untrusted processes in a non-secure domain and a plurality of sensitive processes in a secure domain, said method impeding leakage of information regarding cache access behaviour of a section of at least one of said sensitive processes to said plurality of untrusted processes.

It may be that the secure and non-secure domains are set up such that all processes that execute in the secure domain are trusted and thus, it is only information leakage between the sensitive processes and the untrusted processes that the method is concerned with, information leakage between secure processes being allowed.

In some embodiments said steps of switching between processing in said secure and non-secure domains is performed via a monitor mode, said monitor mode initiating said evicting of information stored in locations of said at least one cache which may otherwise be evicted by said section of said sensitive process on detecting that a switching between domains involves switching to said section of said sensitive process.

Control of switching between secure and non-secure domains can advantageously be performed by a monitor mode. The monitor mode can act to impede data leakage between the domains and can be used to initiate the evicting of information.

In some embodiments said section of said sensitive process is a security critical section.

The section of the sensitive process whose cache access behaviour is protected by this method may be the whole of the sensitive process or it may be a particularly security critical section. This is a section where processing of extremely sensitive data is performed. For example it may be processing involving a cryptographic key.

In some embodiments, said security critical section of said sensitive process comprises cryptography processing.

Cryptography processing may involve calculations where a cache access pattern can be used to derive the cryptographic key. Thus, in such cases it is extremely important that these access patterns cannot be derived by untrusted processes.

In some embodiments said information stored in said at least one cache prior to processing of said security critical section is at least one lookup table that said security critical section requires data from.

Although embodiments can be used for caches storing different types of information used in cryptography, for example it could be used for instruction caches storing cryptographic instructions, it is however, particularly applicable to cryptographic processing which uses data lookup tables. Such cryptographic processing is vulnerable to cache access pattern attack, wherein the cryptographic keys are derived from analysis of cache access patterns. Thus, this technique is particularly useful when applied to caches storing these lookup tables.

Although in some embodiments, only a single secure sensitive process is being processed by said data processing apparatus, in others a plurality of sensitive processes are being processed by said data processing apparatus, each comprising a cryptography processing section, said cryptography processing sections requiring data from a plurality of lookup tables, said data processing apparatus further comprising a plurality of lookup flags corresponding to each of said plurality of lookup tables, wherein said method further comprises the following steps of: prior to commencing processing in said secure mode, setting said plurality of lookup flags to a first predetermined value; prior to commencing or resuming processing of a security critical section of one of said plurality of secure processes by said processor: storing at least one of said plurality of lookup tables that said security critical section of said sensitive process requires data from in said at least one cache when said corresponding lookup flag is set to said first predetermined value and setting said corresponding lookup flag to a second predetermined value; and not storing said information to said at least one cache if said corresponding lookup flag is set to said second predetermined value.

In the case that there are a plurality of cryptographic processes being performed requiring a plurality of lookup tables, it may be advantageous to record which lookup tables have already been stored in the cache, such that it is known whether or not this data needs to be loaded into the cache to impede leakage of the cache access patterns or whether or not this data loading is not required as this data is already present in the cache.

In some embodiments prior to executing said section of said sensitive process, predetermined steps are performed to indicate said section is being executed and following completion of said section further steps are performed to indicate said section has completed.

In order for the data processing apparatus to know when it switches between processes whether or not a particular section of the sensitive process is to be recommenced, steps can be taken to record this information such that it is available for the processing apparatus at the required time. This helps the processor efficiently control the steps that need to be taken to ensure that information leakage is reduced.

In some embodiments one of said predetermined steps comprises setting an indicator value to indicate that said section of said process is being executed and one of said further steps comprises resetting said indicator value to indicate that said section of said process is no longer being executed; and on switching back to said sensitive process determining if said section is to be processed from said indicator value and if so initiating a handler routine, said handler routine comprising the step of storing information that may be required by said section of said sensitive process in said at least one cache prior to recommencing said section of said sensitive process.

A convenient way of recording whether or not a particular section of a sensitive process is to be processed is by the use of an indicator value, that can be set and reset when the section is commenced or finished.

In some embodiments, said information comprises instructions, while in others said information comprises data.

Detail of the cache access behaviour of a sensitive process can lead to the undesired leakage of information for both data cache and instruction cache accesses. Thus, embodiments of the present information can be applied to both sorts of caches.

In some embodiments said locations of said at least one cache comprise cache lines.

A further aspect comprises a computer program product which is operable when run on a data processor to control the data processor to perform the steps of the method.

A yet further aspect provides a data processing apparatus comprising at least one processor adapted to perform sensitive and untrusted processes and at least one cache adapted to store information required by said processor while performing said sensitive and untrusted processes, said data processing apparatus further comprising: control logic configured to detect a section of said sensitive process that is to be processed and in response to detection of said section and prior to commencing or recommencing processing of said section, said control logic is configured to evict information stored in locations of said at least one cache which may otherwise be evicted by said sensitive process loading information that may be required by said section of said sensitive process in said at least one cache.

The above, and other objects, features and advantages will be apparent from the following detailed description of illustrative embodiments which is to be read in connection with the accompanying drawings.

BRIEF DESCRIPTION OF THE DRAWINGS

FIG. 6 shows example cryptographic code.

DESCRIPTION OF EXAMPLE EMBODIMENTS

Figure 1:
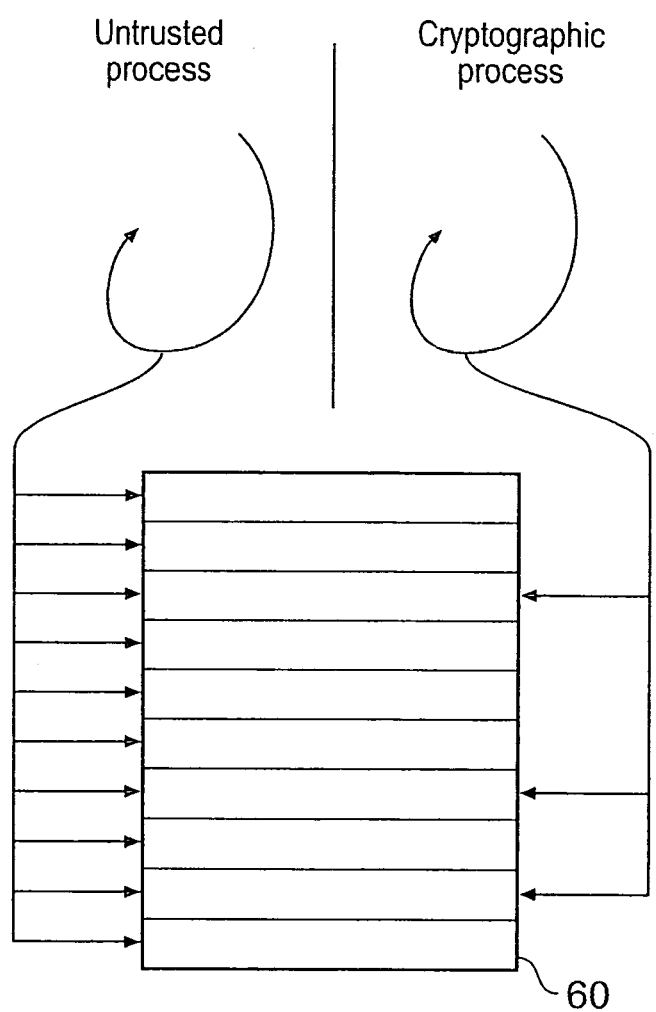
FIG. 1 schematically shows an untrusted process and secure process sharing a cache according to the prior art.
Figure 2:
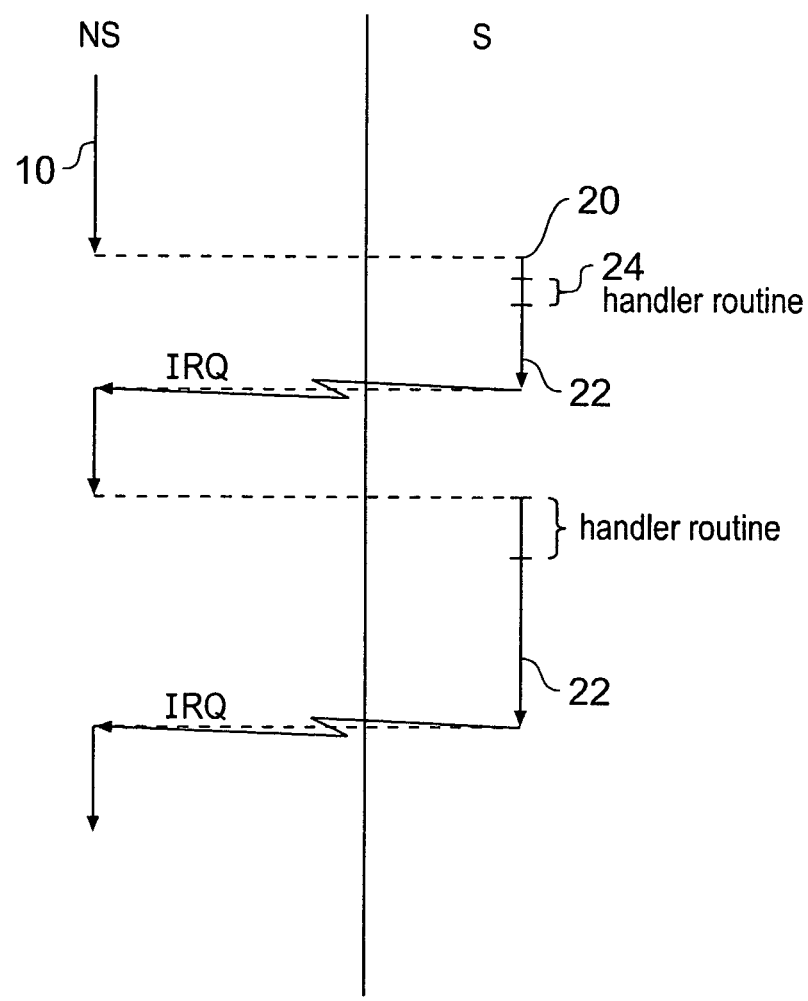
FIG. 2 schematically shows non-secure and secure processes being executed according to an example embodiment.

FIG. 2 schematically shows an untrusted process 10 executing in a non secure domain and a sensitive process 20 executing in a secure domain. A sensitive process 20 has a security critical section 22 which may for example be cryptographic processing involving lookup tables. Prior to entering this section, a handler routine 24 is performed. This handler routine 24 analyses which information is going to be required by the critical section during processing, for example, if it is a cryptographic process then it may assess which lookup tables are required, it then acts to pre-load this information into the cache prior to commencing processing of this critical section. The Figure then shows section 22 being interrupted and untrusted process 10 being resumed. As the handler routine preloaded any information that might be needed by security critical section 22, no information regarding the access patterns of this portion of the sensitive process can be derived by untrusted process 10, as the appropriate portion of the cache was in effect saturated prior to executing portion 22. When processing of the secure process 20 is resumed, the security critical section 22 is to be resumed. Prior to resuming processing of this section the handler routine is once again executed. This ensures once again that information regarding cache access behaviour of the critical sensitive section cannot be derived by the untrusted process 10. Furthermore, by performing the handler routine on return to the processing of the security critical section rather than on leaving it the latency of the interrupt IRQ is not affected.

Figure 3:
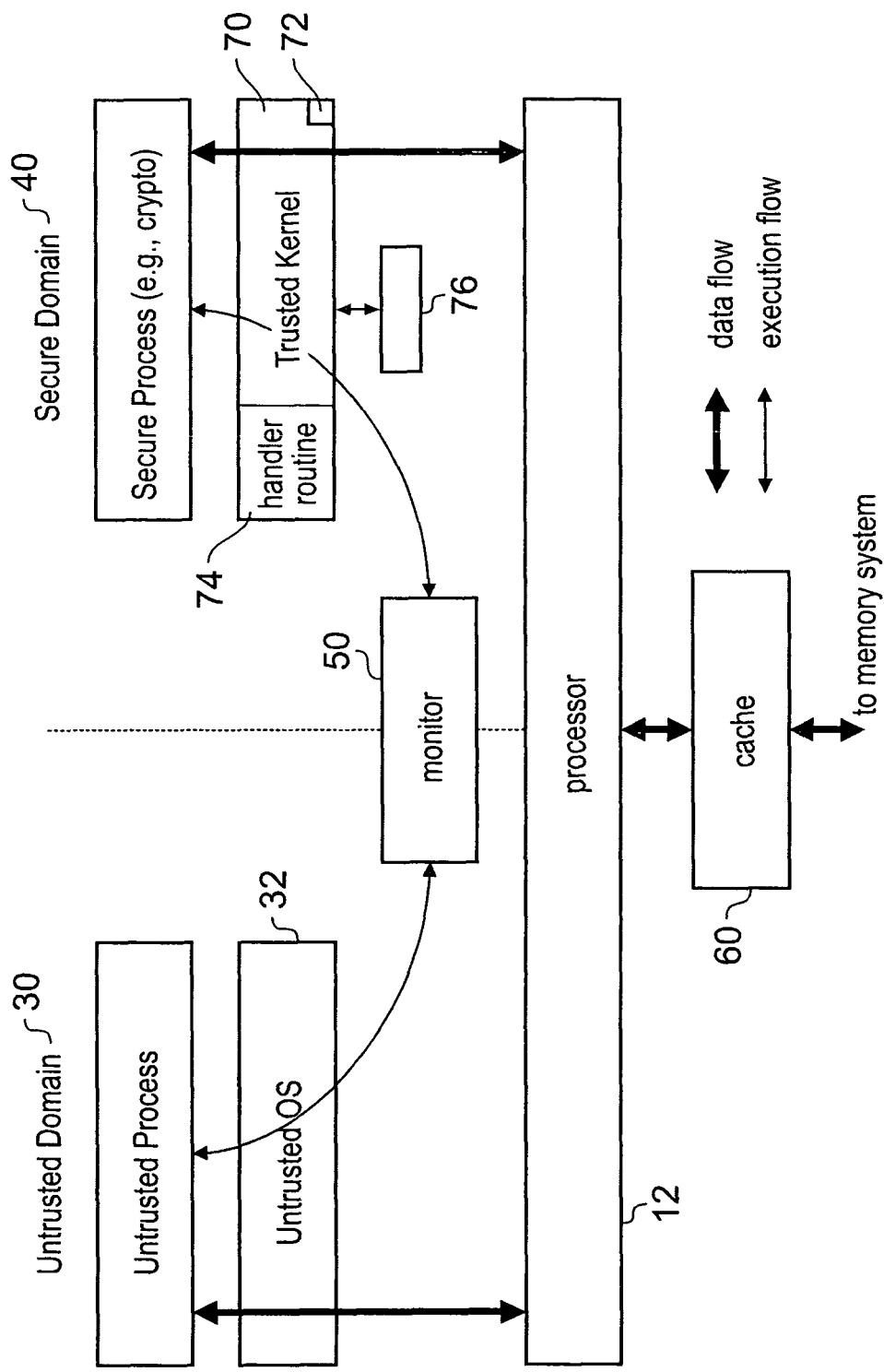
FIG. 3 schematically shows a data processing apparatus according to an example embodiment.

FIG. 3 shows a data processing apparatus according to an example embodiment operable to process an untrusted process 10 and a secure process 20 such as those shown in FIG. 2, on a processor 12. The data processor apparatus comprises a non-secure or untrusted domain 30 and a secure domain 40, switching between these domains being controlled by monitor mode 50. Non-secure domain 30 has an OS 32 that can control execution of the untrusted process 10 on processor 12. When the untrusted process 10 (see FIG. 2) is to switch to a sensitive process 20 (see FIG. 2), this switch is performed via a monitor mode 50.

Secure domain 40 comprises a secure kernel 70 which has a security critical section indicator 72 which is set when a security critical section of code is being processed and is reset when it completes. Thus, on switching to the secure domain from the non-secure domain if it is set, this indicates that the security critical section had not completed and is thus, to be resumed.

Secure kernel 70 also comprises a handler routine 74, which is executed when initiating or resuming a security critical section and acts to perform the security steps required to impede leakage of information concerning cache access patterns. Secure domain 40 also comprises a scoreboard 76 operable to store data relating to cryptographic lookup tables. Each time a cryptographic lookup table is stored in the cache 60, the corresponding indicator bit in the scoreboard 76 is set, so that if a handler routine 74 determines that a certain lookup table is required by a security critical section it knows from the scoreboard whether it needs to load this data or not. If it does need to load the data then having loaded the data it sets the corresponding indicator bit in the scoreboard 76 to record this. On switching back via monitor mode to the non-secure domain, the values in the scoreboard 76 may be reset, alternatively they can be reset prior to processing a security critical portion of a secure process. In any case they must be reset between processing in the non-secure domain and resuming processing in a security critical section of the secure domain.

On switching from untrusted process 10 to secure process 20, via monitor mode 50, monitor mode switches control of the processing to secure kernel 70. Secure kernel 70 looks at security critical section indicator 72 to discover if sensitive process 20 is currently in the security critical section 22 (see FIG. 2). If security indicator 72 indicates that this is the case, then secure kernel 70 will act to initiate handling routine 74 before this part of the program is recommenced. Handler routine 74 looks to see which lookup tables security critical section 22 of process 20 requires data from. It then pre-loads these lookup tables into cache 60 and sets corresponding lookup table indicator bits in scoreboard 76 to indicate that these lookup tables have been preloaded. At this point, the security critical section 22 can be processed by cryptographic logic 80. Once the cryptographic logic 80 has finished processing this section, it returns control to the kernel 70 and the security critical section indicator bit 72 is reset. If there is a further security critical section within process 20 then once again the bit 72 is set and a handler function is run by control logic 74. This handler function looks at this next security critical section to see which lookup tables are required. It then looks at scoreboard 76 to see if these are already pre-loaded in cache 60. If this is the case, it does not need to preload them. If there are additional lookup tables required to those required by the previous section then these are preloaded into cache 60 and the corresponding lookup table bit in score board 76 is set. The cryptographic logic 80 then proceeds to process this section of process 20. It should be noted that these different security critical sections could be in a single thread of process 20 or in separate threads.

If an interrupt occurs from non-secure section of the processor indicating that process 10 should be resumed then monitor mode 50 returns processing to process 10. At this point the scoreboard bits may be reset. This can be done independently of returning processing to process 10 so as not to affect the latency of the interrupt. Alternatively, they may be reset on return to secure processing.

Although in this embodiment a scoreboard is used to track the loading of lookup tables in the cache which relate to which security critical section has been entered, it will be clear to a skilled person that this could be done in other ways. For example, the secure kernel 70 could keep track of which lookup tables have been loaded in logic within the secure kernel.

Figure 4:
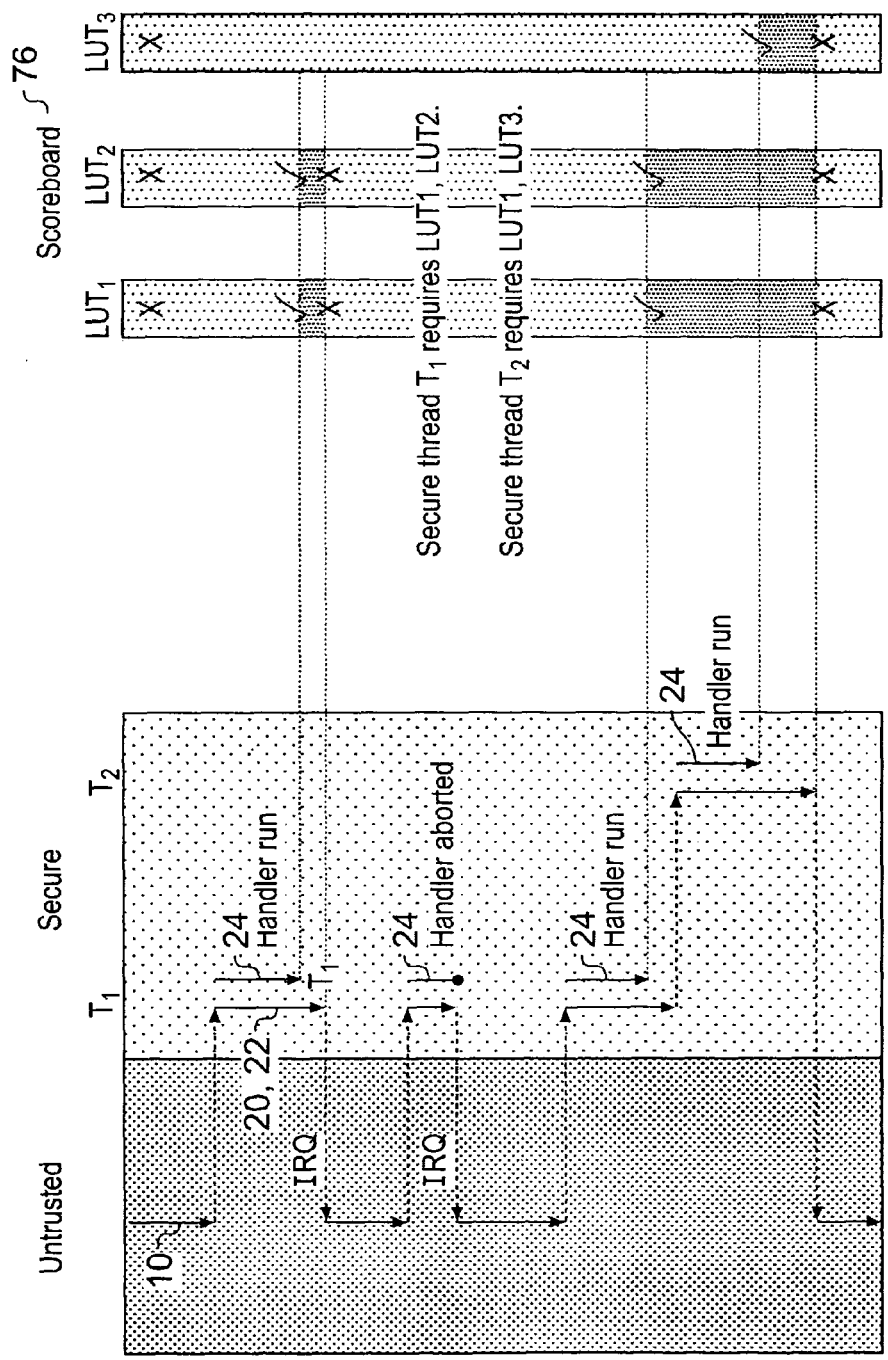
FIG. 4 schematically shows non-secure and secure processes having different threads according to an example embodiment.

FIG. 4 schematically shows a process performed by a data processing apparatus such as that described in FIG. 3. As can be seen, process 10 switches to process 20, process 10 being an untrusted process and process 20 being a sensitive process. On switching, handler routine 24 is called and executed as indicator bit 72 indicates processing of process 20 is in a security critical section 22. In response to the switching of domains the handler routine 24 resets the values in scoreboard 76.

The security critical section 22 is thread T1 of process 20 and requires lookup tables 1 and 2. A handler routine 24 assesses that thread T1 needs lookup table 1 and lookup table 2 and sets these bits appropriately in scoreboard 76 and loads the data from these tables into the cache. The security critical section 22 can then be processed. Following an interrupt IRQ, processing is returned to process 10. When processing is switched back to resume section 22, handler routine 24 is once again executed in response to indicator bit 72 being set. As is shown in this example, the handler routine can itself be interrupted and if this occurs the processor is simply switched back to process 10, although an indicator bit is set to indicate that the handler has been interrupted. On switching back to process 20, the handler routine 24 must be started again before resuming process 2. This involves resetting the scoreboard and then resuming T1 by loading lookup table 1 and lookup table 2 and setting the appropriate bits in the scoreboard 76.

This is one way of dealing with the handler routine being interrupted, in other embodiments where it is not possible to abort and restart the handler or where the handler cannot be executed recursively, interrupts may be simply disabled while the handler routine is running. This is clearly a simple solution but has latency drawbacks.

When this thread T1 has completed, thread T2 is then processed, this is also a sensitive process and requires lookup table 1 and lookup table 3. A handler routine 24 is therefore performed and lookup table 3 is loaded and the bit for lookup table 3 is set in scoreboard 76, as scoreboard 76 has indicated that lookup table 1 is already loaded in the cache and thus the handler routine 24 knows that reloading of this table is not required. When thread T2 completes a non security critical section is next and thus, indicator bit 72 is reset.

In the above described embodiments, information leakage between the secure and non-secure domain is controlled and it is assumed that all secure processes are trusted. This may not always be the case and in some embodiments switching threads within the secure domain may also act to trigger flushing of the scoreboard 76, so that all lookup tables required by the next process need to be preloaded. Similarly in cases where two processes are in different security domains but it is desirable that cache access behaviour information of one process is not observable by another process, then, similarly to the previous examples there may be a handler routine run on switching from process 1 to process 2.

Figure 5:
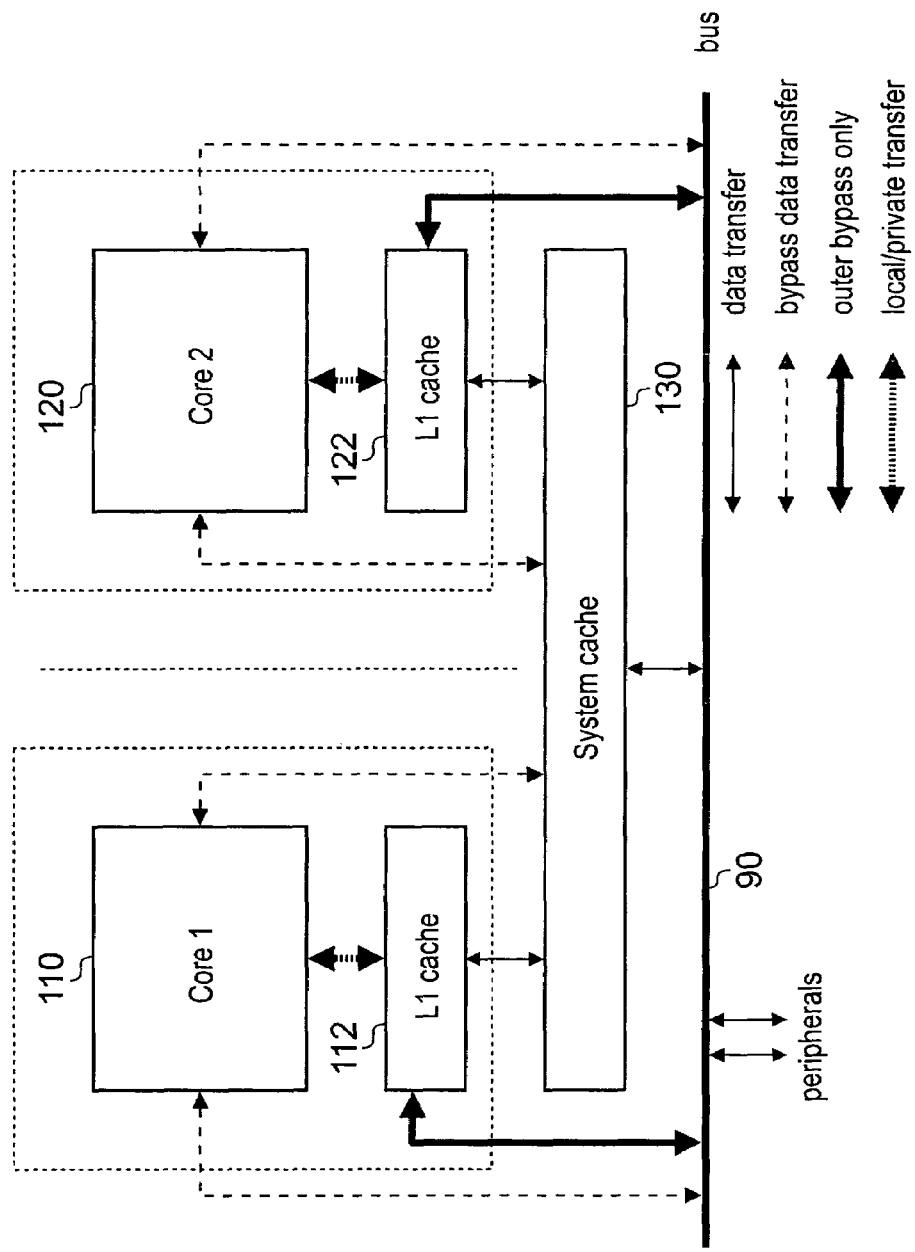
FIG. 5 is a block diagram of a data processing system in which example embodiments may be employed.

FIG. 5 is a block diagram of a data processing system in which example embodiments may be employed. The system includes two processor cores 110 and 120. Each of the processor cores 110, 120 has its own associated level one cache 112 and 122. Various devices are connected via a system bus 90. In particular, a system cache 130 is provided which can store data values for access by processor core 110 or processor core 120, these processor cores hence sharing access to the system cache 130.

Also provided are one or more peripheral devices (not shown) which are accessed via a peripheral interface (not shown) interconnecting the system bus 90 with a peripheral bus (not shown). These peripheral devices may exist off-chip or may be provided on-chip.

In accordance with one example embodiment, the data processing apparatus has a plurality of domains in which the devices of the data processing apparatus can operate. In one particular embodiment, the plurality of domains comprises a secure domain and a non-secure domain, and predetermined access rights are associated with each domain. In particular, in one embodiment, when operating in the non-secure domain, a device can only access non-secure data associated with that non-secure domain. Hence, any device operating in the non-secure domain cannot access secure data pertaining to the secure domain. The predetermined access rights associated with the secure domain can take a variety of forms, but typically will allow a device operating in the secure domain to access both the secure data of the secure domain and the non-secure data of the non-secure domain.

Each of the cores 110, 120 can only operate in one domain at a time, but at any point in time those individual processor cores may be operating in different domains with respect to each other.

The caches 112, 122, 130 within the data processing apparatus can be arranged to store both secure data and non-secure data and a bit can be associated with each cache line to identify whether the data stored in that cache line is secure data or non-secure data. More details of a cache arranged in such a way is described in commonly assigned co-pending U.S. patent application Ser. No. 10/714,481, the contents of which are herein incorporated by reference.

In accordance with example embodiments, each of the cores 110, 120, is arranged to output a domain ID signal identifying the domain in which that master device is currently operating. This can be used to allow access to certain data in the cache or to deny access, depending on the domain and the security status of the cache. Thus, access to secure data by a non-secure process running on either core1 110 or core2 120 can be denied. However, although secure data can be protected from unauthorised access, cache access patterns may be vulnerable and may leak information about secure data being processed by the secure domain. When accessing the L1 caches specific to a particular core the cache access patterns can be protected by the use of handler routines as described above, wherein the cache locations that may be accessed by the secure routine are evicted prior to executing the secure routine or at least prior to executing a particularly critical section of that secure routine, so that no secure data can be derived from observation of cache access patterns.

However, use of the system cache 130 by security critical sections of code can produce problems because as more than one processor is accessing the cache at one time, it is difficult to protect the cache access patterns. In order to address this problem example embodiments can act to ensure that in security critical sections of code only the local L1 caches are used. Alternatively, a decision can be made to use the system cache, as long as it is appreciated that there is an additional risk with so doing. Any use of the shared cache adds risk (which may be acceptable), because the other processing tasks can evict the lines in the system cache, and then spot when they are reloaded.

A further option could be to for the handler routine to enforce arbitrary security constraints while executing a "security critical section". In the case of a single processing core these constraints are just that the cache side-channel must be closed. This can be achieved by ensuring that no sensitive data can be obtained as a result of observation of cache access behaviour of a sensitive section of a secure process by some untrusted process. However, in the multi-core case (as shown in FIG. 6) this may involve stopping all untrusted processing tasks in other cores until the security critical section is completed. In such a case it would be acceptable to allow the system level cache to be used by a security critical section.

FIG. 6 shows example code used in an example embodiment. When a security critical section SCS is to be executed or resumed (after a switch to the non-secure domain) a handler routine for that section is executed prior to the security critical section. Thus, when the SCS is to be executed in response to an EnterSCS instruction handler 1 is run first. This might involve preloading any look up tables that may be required by the security critical section SCS in to the data cache thereby preventing information relating to access patterns of this data being available to a hacking process. This section is then left in response to the instruction LeaveSCS.

Non secure processes are then run. Then in response to enterSCS(handler2), a handler relevant to the next security critical section is run prior to execution of this section. This handler routine may involve preloading an instruction sequence that may be required by the security critical section into the I cache, thereby preventing a non-trusted process from being able to derive information regarding instruction access patterns of the security critical section. It may alternatively simply involve invalidating a part of the cache that may be accessed by the SCS that is to be executed. It should be noted that if the processing switches domain to the non-secure domain during processing of the security critical section SCS2 then the handler routine (handler2) will need to be executed again prior to resuming the security critical section SCS2 in the secure domain.

Although example embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. A method of impeding leakage of cache access behavioural information of a section of a sensitive process to an untrusted process, said sensitive and untrusted processes being performed by a processor within a data processing apparatus, said data processing apparatus further comprising at least one cache operable to store information required by said processor while performing said sensitive and untrusted processes, the method comprising:

prior to commencing processing of a section of said sensitive process by said processor, evicting information stored in locations of said at least one cache which at least some of which would otherwise be evicted by said sensitive process loading further information at least some of which is required by said section of said sensitive process in said at least one cache, said evicting said information comprising storing said further information at least some of which is required by said section of said sensitive process in said at least one cache;

commencing processing of said section of said sensitive process by said processor;

switching said processor during processing of said section of said sensitive process to said untrusted process in response to a switching request;

on switching back to said section of said sensitive process from said untrusted process, evicting information stored in locations of said at least one cache at least some of which would otherwise be evicted by said sensitive process loading information at least some of which is required by said section of said sensitive process in said at least one cache prior to recommencing processing of said section of said sensitive process.

2. A method according to claim 1, wherein said processor is operable in a secure domain and a non-secure domain, said processor being operable such that when executing a program in a secure domain said program has access to secure data which is not accessible when said processor is operating in a non-secure domain, wherein said sensitive process is a secure process executed in said secure domain, and said untrusted process is a process executed in a non-secure domain.

3. A method according to claim 2, wherein said processor is operable to process a plurality of untrusted processes in a non-secure domain and a plurality of sensitive processes in a secure domain, said method impeding leakage of information regarding cache access behaviour of a section of at least one of said sensitive processes to said plurality of untrusted processes.

4. A method according to claim 2, wherein said steps of switching between processing in said secure and non-secure domains is performed via a monitor mode.

5. A method according to claim 4, wherein said monitor mode initiates said evicting of information stored in locations of said at least one cache which would otherwise be evicted by said section of said sensitive process on detecting that a switching between domains involves switching to said section of said sensitive process.

6. A method according to claim 2, wherein said section of said sensitive process is a security critical section.

7. A method according to claim 6, wherein said security critical section of said sensitive process comprises cryptography processing.

8. A method according to claim 7, wherein said further information stored in said at least one cache prior to processing of said security critical section is at least one lookup table that said security critical section requires data from.

9. A method according to claim 8, wherein a plurality of sensitive processes are being processed by said data processing apparatus, each comprising a cryptography processing section, said cryptography processing sections requiring data from a plurality of lookup tables, said data processing apparatus further comprising a plurality of lookup flags corresponding to each of said plurality of lookup tables, wherein said method further comprises the following steps of:
   prior to commencing processing in said secure mode, setting said plurality of lookup flags to a first predetermined value;
   prior to commencing or resuming processing of a security critical section of one of said plurality of secure processes by said processor:
      storing at least one of said plurality of lookup tables that said security critical section of said sensitive process requires data from in said at least one cache when said corresponding lookup flag is set to said first predetermined value and setting said corresponding lookup flag to a second predetermined value; and
      not storing said information to said at least one cache if said corresponding lookup flag is set to said second predetermined value.

10. A method according to claim 1, wherein prior to executing said section of said sensitive process, predetermined steps are performed to indicate said section is being executed and following completion of said section further steps are performed to indicate said section has completed.

11. A method according to claim 10, wherein one of said predetermined steps comprises setting an indicator value to indicate that said section of said process is being executed and one of said further steps comprises resetting said indicator value to indicate that said section of said process is no longer being executed; wherein
   on switching back to said sensitive process determining if said section is to be processed from said indicator value and if so initiating a handler routine, said handler routine comprising the step of storing said further information at least some of which is required by said section of said sensitive process in said at least one cache prior to recommencing said section of said sensitive process.

12. A method according to claim 1, wherein said information and said further information comprises instructions.

13. A method according to claim 1, wherein said information and said further information comprises data.

14. A method according to claim 1, wherein said locations of said at least one cache comprise cache lines.

15. A non-transitory storage medium storing a computer program which is operable when run on a data processor to control the data processor to perform the steps of the method according to claim 1.

16. A data processing apparatus comprising:
   at least one processor configured to perform sensitive and untrusted processes and at least one cache configured to store information required by said processor while performing said sensitive and untrusted processes,
   control logic circuitry configured to detect a section of said sensitive process that is to be processed and in response to detection of said section and prior to commencing or recommencing processing of said section,
   said control logic circuitry is configured to evict information stored in locations of said at least one cache which would otherwise be evicted by said sensitive process loading further information at least some of which is required by said section of said sensitive process in said at least one cache and to store said further information in said at least one cache,
   said processor is configured to commence processing of said section of said sensitive process;
   said control logic circuitry is configured to switch said processor during processing of said section of said sensitive process to said untrusted process in response to a switching request;
   on switching back to said section of said sensitive process from said untrusted process, said control logic circuitry is configured to evict information stored in locations of said at least one cache at least some of which would otherwise be evicted by said sensitive process loading information at least some of which is required by said section of said sensitive process in said at least one cache prior to recommencing processing of said section of said sensitive process.

17. A data processing apparatus according to claim 16, said data processing apparatus further comprising an indicator value store, said control logic circuitry being configured to store a predetermined value in said indicator value store in response to commencing processing of said section and to store a different value in said indicator value store in response to completing processing of said section.

18. A data processing apparatus according to claim 16, said data processing apparatus further comprising a scoreboard operable to store a plurality of lookup flags, said control logic circuitry being configured to prior to commencing processing in said secure mode, setting said plurality of lookup flags to a first predetermined value, and prior to commencing or resuming processing of a security critical section of one of said plurality of secure processes by said processor:
   storing at least one of said plurality of lookup tables that said security critical section of said sensitive process requires data from in said at least one cache when said corresponding lookup flag is set to said first predetermined value and setting said corresponding lookup flag to a second predetermined value; and
   not storing said information to said at least one cache if said corresponding lookup flag is set to said second predetermined value.

* * * * *